US011132151B2

(12) United States Patent
Matsuda et al.

(10) Patent No.: US 11,132,151 B2
(45) Date of Patent: Sep. 28, 2021

(54) COMMUNICATION DEVICE AND NON-TRANSITORY COMPUTER-READABLE MEDIUM FOR COMMUNICATION DEVICE

(71) Applicant: BROTHER KOGYO KABUSHIKI KAISHA, Nagoya (JP)

(72) Inventors: Munehisa Matsuda, Nagoya (JP); Yongyong Ren, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/177,523

(22) Filed: Nov. 1, 2018

(65) Prior Publication Data
US 2019/0129658 A1 May 2, 2019

(30) Foreign Application Priority Data
Nov. 2, 2017 (JP) .............................. JP2017-212504

(51) Int. Cl.
G06F 3/12 (2006.01)
G06F 8/65 (2018.01)
H04N 1/00 (2006.01)

(52) U.S. Cl.
CPC ............ *G06F 3/123* (2013.01); *G06F 3/1204* (2013.01); *G06F 3/1287* (2013.01); *G06F 8/65* (2013.01); *H04N 1/00938* (2013.01)

(58) Field of Classification Search
CPC ...... G06F 3/123; G06F 3/1204; G06F 3/1287; G06F 8/65; H04N 1/00938
See application file for complete search history.

(56) References Cited

U.S. PATENT DOCUMENTS

| 2006/0109505 | A1* | 5/2006 | Ha | ..................... H04N 1/00244 358/1.15 |
| 2007/0245333 | A1* | 10/2007 | Ferlitsch | ................... G06F 8/65 717/168 |
| 2008/0079286 | A1* | 4/2008 | Ferlitsch | ................. G06F 19/00 296/186.1 |
| 2010/0250787 | A1 | 9/2010 | Miyata | |
| 2012/0127523 | A1* | 5/2012 | Terashita | .............. G06F 3/1285 358/1.15 |

(Continued)

FOREIGN PATENT DOCUMENTS

| JP | H11-282687 A | 10/1999 |
| JP | 2010-231387 A | 10/2010 |
| JP | 2014-35752 A | 2/2014 |

*Primary Examiner* — Huo Long Chen
(74) *Attorney, Agent, or Firm* — Scully, Scott, Murphy & Presser, PC

(57) ABSTRACT

A communication device may send URL and first program to a terminal device, the URL indicating a storage location of update data stored in a first server, the update data being used for updating a setting data, the first program causing a browser program in the terminal device to perform a first process. The first process may include receiving the update data from the first server by using the URL and sending the update data received from the first server to the communication device. The communication device may receive the update data from the terminal device in response to sending the URL and the first program to the terminal device and update the setting data stored in the memory by using the update data received from the terminal device.

6 Claims, 9 Drawing Sheets

(56) References Cited

U.S. PATENT DOCUMENTS

| | | | |
|---|---|---|---|
| 2014/0047432 A1 | 2/2014 | Michishita | |
| 2014/0146358 A1* | 5/2014 | Morita | H04N 1/00424 |
| | | | 358/1.15 |
| 2015/0178064 A1* | 6/2015 | Cairns | G06F 8/65 |
| | | | 717/171 |
| 2016/0009105 A1* | 1/2016 | Yamada | B41J 5/30 |
| | | | 347/6 |

* cited by examiner

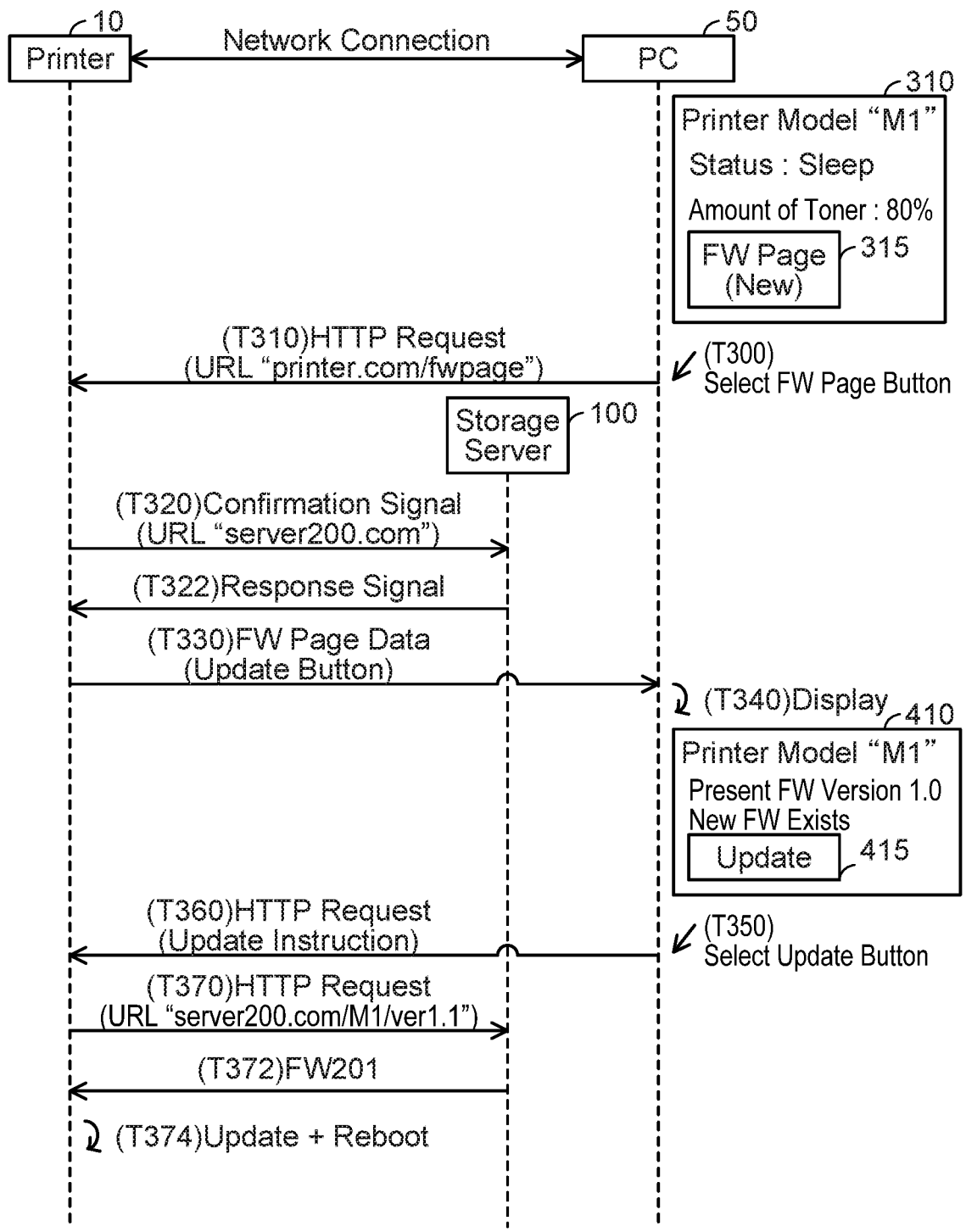

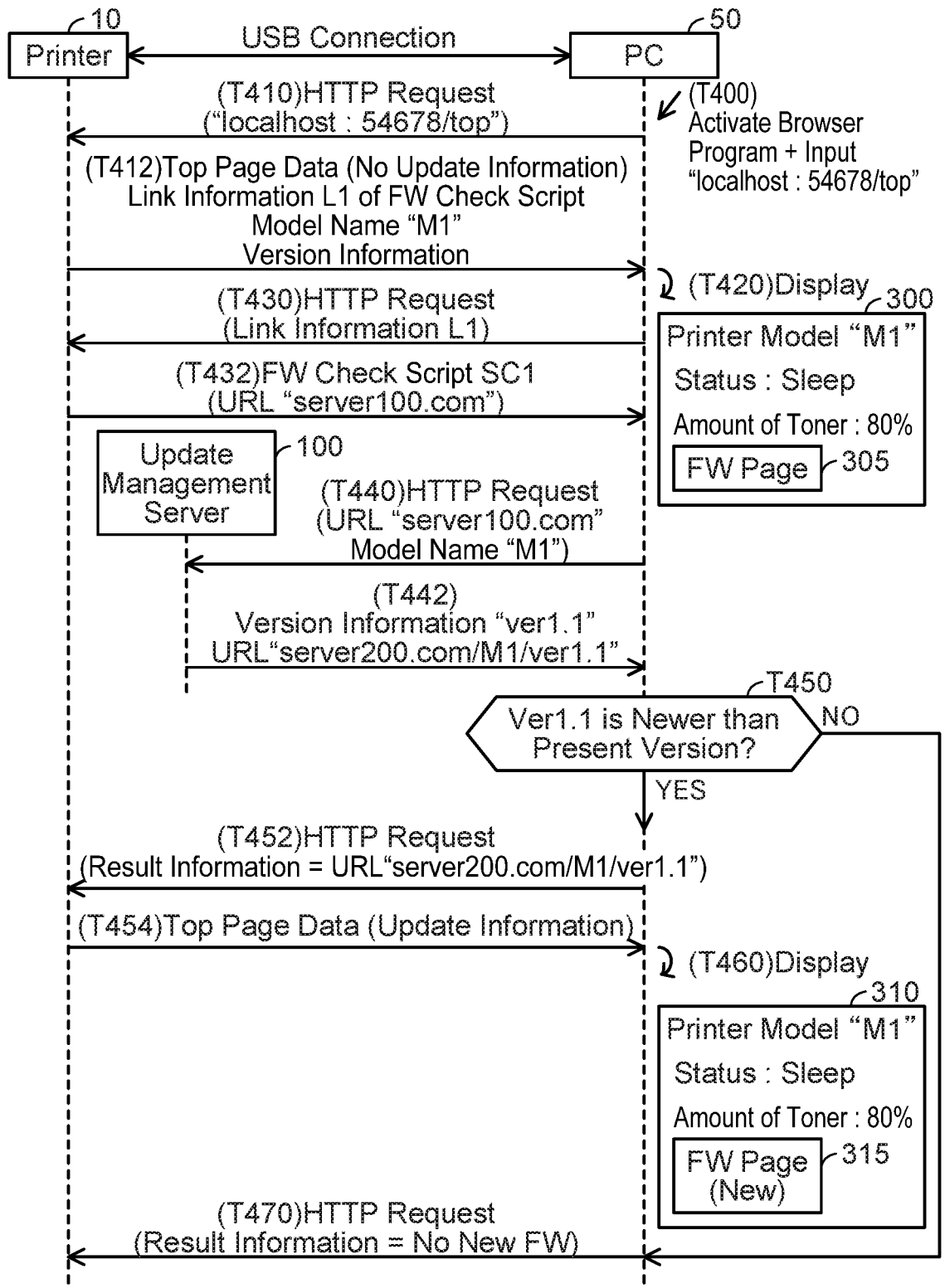

COMMUNICATION DEVICE AND NON-TRANSITORY COMPUTER-READABLE MEDIUM FOR COMMUNICATION DEVICE

CROSS-REFERENCE TO RELATED APPLICATION

This application claims priority to Japanese Patent Application No. 2017-212504 filed on Nov. 2, 2017, the contents of which are hereby incorporated by reference into the present application.

TECHNICAL FIELD

The description herein discloses a technique configured to update setting data of a communication device.

DESCRIPTION OF RELATED ART

A web browser of a PC (abbreviation of Personal Computer) downloads an update file from a firmware server in accordance with an instruction from a user. The web browser causes an image processing device to perform firmware update according to the update file by sending the update file to the image processing device.

SUMMARY

In the above technique, it is silent as to what sort of instruction is given to the PC from the user for the web browser of the PC to download the update file from the firmware server. For example, in a case where this instruction includes an input of URL (abbreviation of Uniform Resource Locator)) of the update file stored in the firmware server, the user must input this URL to the PC using an input device such as a keyboard.

The description herein provides a technique employed in a situation where update data for updating setting data stored in a communication device is stored in a server, with which a terminal device can receive the update data from the server and send the update data to the communication device without a user having have to input URL of the update data to the terminal device.

A communication device disclosed herein may comprise: a processor; and a memory storing setting data and computer-readable instructions therein, the computer-readable instructions, when executed by the processor, causing the communication device to: send Uniform Resource Locater (URL) and first program to a terminal device, the URL indicating a storage location of update data stored in a first server, the update data being used for updating the setting data, the first program causing a browser program in the terminal device to perform a first process, wherein the first process includes: receiving the update data from the first server by using the URL received from the communication device; and sending the update data received from the first server to the communication device, receive the update data from the terminal device in response to sending the URL and the first program to the terminal device; and update the setting data stored in the memory by using the update data received from the terminal device.

Computer-readable instructions for implementation for implementation of the communication device and non-transitory computer-readable recording medium in which the computer-readable instructions are stored are also novel and useful. Moreover, a control method for implementation of the communication device is also novel and useful.

Moreover, a communication system including the communication device described above and at least one of the other devices (e.g. a terminal device, a first server) is also novel and useful.

BRIEF DESCRIPTION OF THE DRAWINGS

FIG. 8 shows Case D in which the firmware page is requested by a network communication;
and
FIG. 9 shows a sequence diagram of a second embodiment.

EMBODIMENTS

Figure 1:
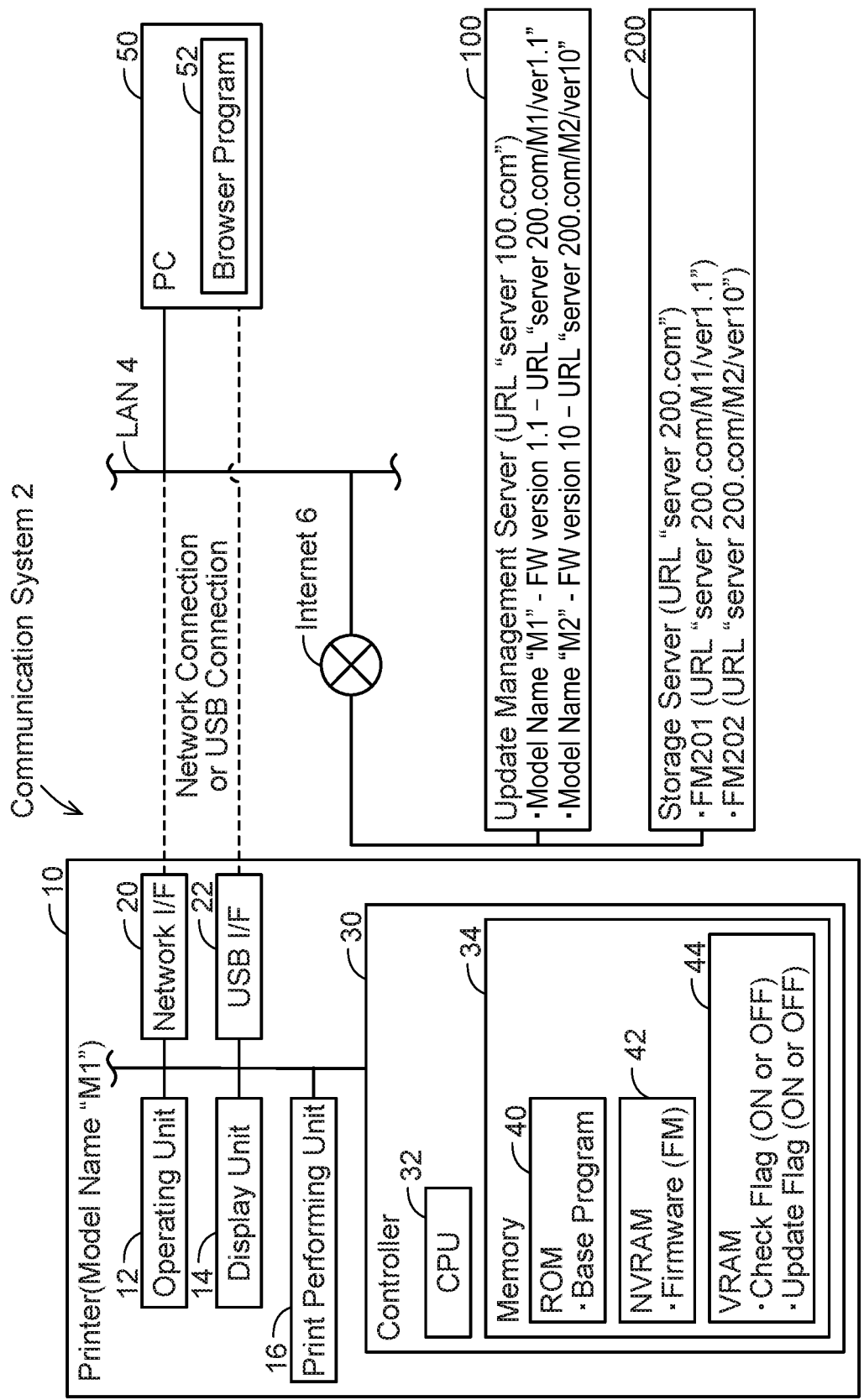
FIG. 1 shows a configuration of a communication system.

First Embodiment (Configuration of Communication System 2; FIG. 1)
As shown in FIG. 1, a communication system 2 includes a printer 10, a PC 50, an update managing server 100, and a storage server 200.

The printer 10 may be connected to a LAN 4 which is a wired LAN (abbreviation of Local Area Network) or a wireless LAN. The PC 50 is connected to the LAN 4. Thus, in a situation where the printer 10 is connected to the LAN 4, the printer 10 and the PC 50 are capable of communicating with each other through the LAN 4. Hereinbelow, a communication executed through the LAN 4 may be termed a "network communication".

The LAN 4 is connected to the Internet 6, and respective servers 100, 200 are located on the Internet 6. The PC 50 stores setting information (such as gateway information) for executing an internet communication. Thus, the PC 50 is capable of communicating with the respective servers 100, 200 located on the Internet 6 through the LAN 4. Further, in a situation where the printer 10 is connected to the LAN 4 and storing the setting information for executing the internet communication, the printer 10 is capable of communicating with the respective servers 100, 200 located on the Internet 6 through the LAN 4.

In a situation where the printer 10 is not connected to the LAN 4, the printer 10 may be connected to the PC 50 via a USB (abbreviation of Universal Serial Bus) cable. In this situation, the printer 10 and the PC 50 are capable of communicating with each other through the USB cable. Hereinbelow, a communication through the USB cable may be termed a "USB communication". In the situation where the printer 10 is not connected to the LAN 4, the printer 10 cannot communicate with the respective servers 100, 200 located on the Internet 6.

(Configuration of Printer 10)
The printer 10 is a peripheral device of the PC 50, and is capable of executing a print function. The printer 10 is a model which is identified by a model name "M1". The printer 10 includes an operating unit 12, a display unit 14, a print executing unit 16, a network interface 20, a USB interface 22, and a control unit 30. The respective units 12 to 30 are connected by a bus line (not shown). Hereinbelow, an interface will be denoted "I/F".

The operating unit 12 includes a plurality of keys. A user can operate the operating unit 12 to input various instructions to the printer 10. The display unit 14 is a display for displaying various types of information. The display unit 14 also function as a so-called touch panel. That is, the display unit 14 functions also as the operating unit. The print executing unit 16 includes an inkjet or laser printing mechanism. The network I/F 20 is an I/F for connecting to the LAN 4, that is, an I/F for executing a network communication using TCP/IP. The USB I/F 22 is an I/F to which one end of the USB cable is to be connected, that is, an I/F for executing the USB communication.

The control unit 30 includes a CPU 32 and a memory 34. The CPU 32 executes various processes according to various programs stored in the memory 34. The memory 34 is constituted of a volatile memory, a nonvolatile memory, etc., and it specifically includes a ROM (abbreviation of Read Only Memory) 40, an NVRAM (abbreviation of Non-Volatile Random Access Memory) 42, and a VRAM (abbreviation of Volatile Random Access Memory) 44.

The ROM 40 stores a basic program for realizing basic operations of the printer 10 (such as displaying on a screen of the display unit 14 and communications through the respective I/Fs 20, 22). The basic program includes a program with which the printer 10 functions as a web server that communicates with the PC 50 by HTTP (abbreviation of Hyper Text Transfer Protocol) using the network communication according to the TCP/IP or the USB communication. The ROM 40 further stores various types of data (such as top page data to be described later, FW page data, FW check script, FW update script, etc.) for the printer 10 to send to the PC 50 in its function as the web server.

The NVRAM 42 is a memory area from which stored contents will not be deleted even when a power of the printer 10 is turned off, and stores firmware for realizing specific operations of the printer 10 (such as printing in the print executing unit 16). Hereinbelow, the firmware will be denoted "FW". Although detailed description will be given later, the present embodiment focuses on a situation of updating the FW.

The VRAM 44 is a memory area from which stored contents are deleted when the power of the printer 10 is turned off, and it stores a check flag and an update flag. The check flag indicates a value of ON, indicating that a FW check has been executed, or OFF, indicating that the FW check has not yet been executed. The FW check is a process using the update managing server 100 to check whether or not a FW that is newer than the printer 10's current FW is stored in the storage server 200. The update flag indicates a value of ON, indicating that a new FW is stored in the storage server 200, or OFF, indicating that the new FW is not stored in the storage server 200. Upon when the power of the printer 10 is turned on, both the check flag and the update flag are set to OFF.

(Configuration of PC 50)

The PC 50 is a terminal device such as a desktop PC, a laptop PC, and a tablet PC. The PC 50 includes a browser program 52 in addition to a well-known OS (abbreviation of Operation System) program (not shown). For example, the browser program 52 is a general program installed to the PC 50 simultaneously with the OS program, and it executes communications according to the HTTP (abbreviation of Hyper Text Transfer Protocol) with web servers to display a web page on a display unit (not shown) of the PC 50.

(Configuration of Update Managing Server 100)

The update managing server 100 is provided on the Internet 6 by a vendor of the printer 10, and is allocated with a URL (abbreviation of Uniform Resource Locator) "server100.com" indicating its location on the Internet 6. The update managing server 100 stores a model name of a printer (such as "M1"), version information indicating a latest FW version for the printer (such as "FW version 1.1"), and a URL of the latest FW (such as "server200.com/M1/ver1.1") in association for each of plural types of printers provided by the vendor. In this embodiment, a larger value of the FW version indicates a newer FW.

(Configuration of Storage Server 200)

The storage server 200 is provided on the Internet 6 by the vendor of the printer 10, and is allocated with a URL "server200.com" indicating its location on the Internet 6. The storage server 200 stores latest FWs 201, 202 for each of the plural types of printers (such as a printer with the model name "M1" and a printer with the model name "M2") provided by the vendor. Each of the FWs 201, 202 is stored at a location indicated by the URL (such as "server200.com/M1/ver1.1") including the model name of the printer (such as "M1") and the FW version (such as "ver1.1").

When the vendor develops a new FW for a certain model of printer, it stores the new FW in place of an old FW for this printer in the storage server 200. Further, the vendor stores a new FW version and a URL indicating a storage location of the new FW in the storage server 200 in association with the model name of the printer in the update managing server 100.

Figure 2A:
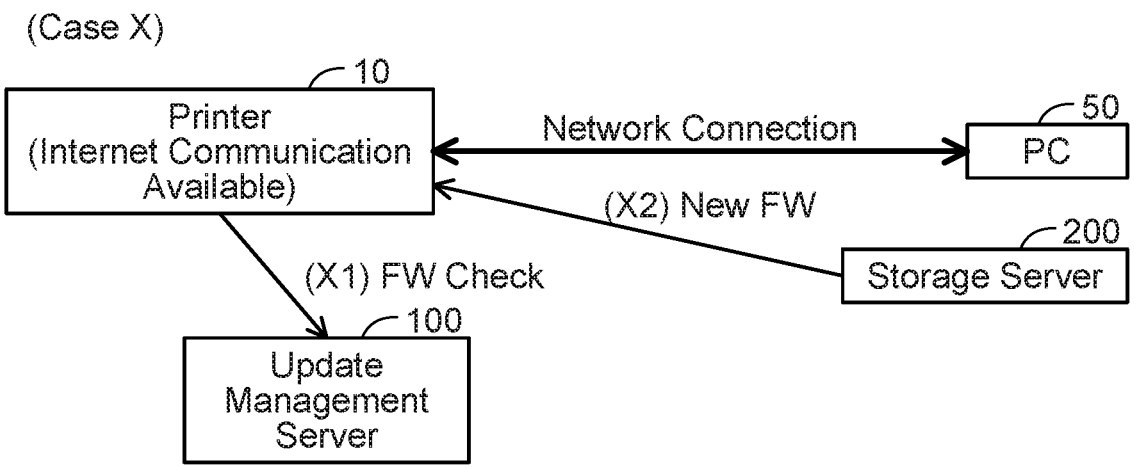
FIG. 2A shows an explanatory diagram for explaining an overview of an embodiment.
Figure 2B:
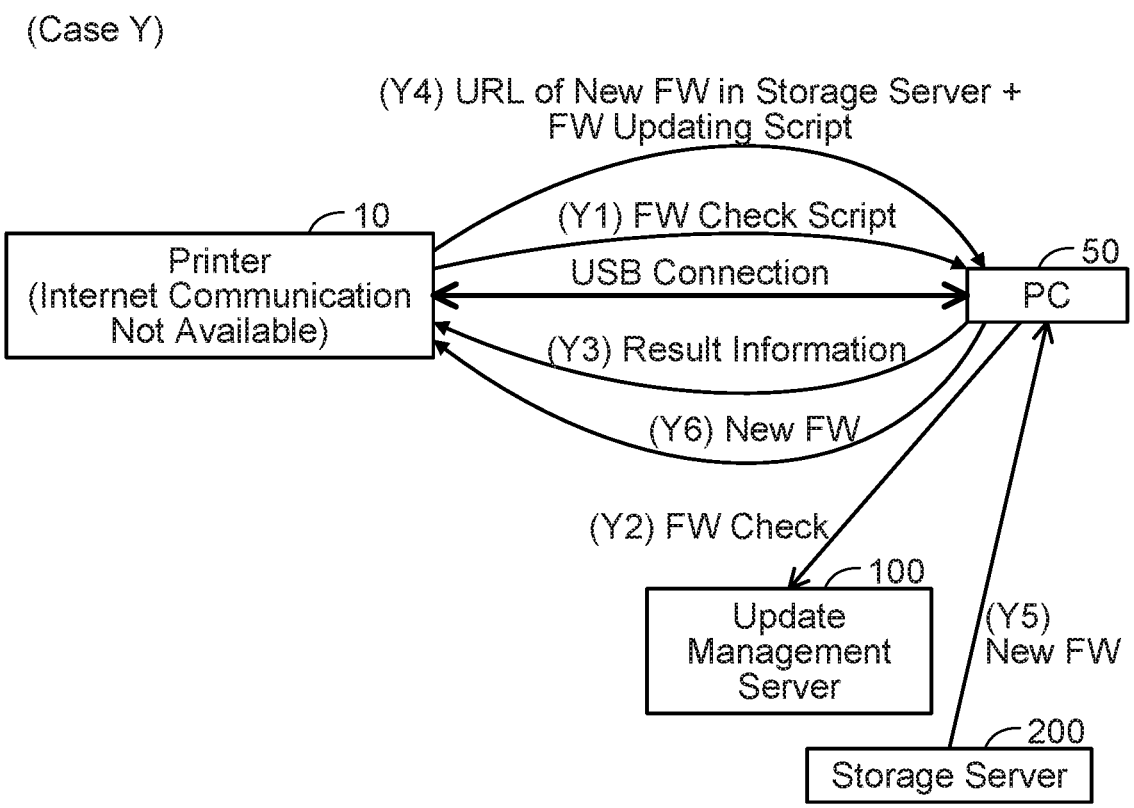
FIG. 2B shows an explanatory diagram for explaining an overview of an embodiment.

(Overview of Operations of Respective Devices 10, 50, 100, 200; FIG. 2)

Next, overview of operations executed by the respective devices 10, 50, 100, 200 to update the FW of the printer 10 will be described with reference to FIG. 2. In Case X, the printer 10 is connected to the LAN 4, and is capable of executing Internet communication. The printer 10 executes the network communication with the PC 50 to receive a HTTP request to access a web server of the printer 10 from the PC 50. In this case, (X1) the printer 10 communicates with the update managing server 100 and executes the FW check. Then, (X2) the printer 10 receives the new FW from the storage server 200, and updates the old FW to the new FW.

In Case Y, the printer 10 is connected to the PC 50 by the USB cable. Since the printer 10 cannot execute the Internet communication, it cannot communicate with the update managing server 100 and execute the FW check, nor can it receive the new FW from the storage server 200. The printer 10 executes the USB communication with the PC 50 and receives the HTTP request from the PC 50. In this case, (Y1) the printer 10 sends a FW check script including the URL of the update managing server 100 to the PC 50. This script has a format interpretable by the browser program 52 of the PC 50, and is a script for causing the PC 50 to execute the FW check. Thus, (Y2) the PC 50 communicates with the update managing server 100 according to this script, and executes the FW check. Then, (Y3) according to the script, the PC 50 sends result information indicating that the new FW is stored in the storage server 200 to the printer 10. This result information includes a URL of the new FW.

Next, (Y4) the printer 10 sends the URL of the new FW and a FW update script to the PC 50. This script has a format interpretable by the browser program 52 of the PC 50, and is a script for causing the PC 50 to execute receiving the new FW from the storage server 200 and sending the new FW to the printer 10. Thus, the PC 50 (Y5) receives the new FW from the storage server 200 according to this script, and (Y6) sends the new FW to the printer 10. Due to this, the printer 10 can update the old FW to the new FW.

As shown in the above Case Y, the printer 10 sends the respective scripts interpretable by the browser program 52 of the PC 50 to the PC 50 (see the above (Y1) and (Y4)) in a situation where the Internet communication cannot be executed. Due to this, the above processes can be executed using the general browser program 52 even if the PC 50 does not store a dedicated application for executing the processes of (Y2), (Y3), (Y5), and (Y6) as above. Further, the FW check script in (Y1) as above includes the URL of the update managing server 100. Further, in (Y4) as above, the URL of the new FW is included. Thus, even if the user does not input these URLs to the PC 50, the PC 50 can use these URLs to execute the processes as above.

In the present embodiment, the processes of Case Y as above are executed in the situation in which the printer 10 cannot execute the Internet communication, however, in a variant, the processes of Case Y as above may be executed even in a situation in which the printer 10 is capable of executing the Internet communication.

Figure 3:
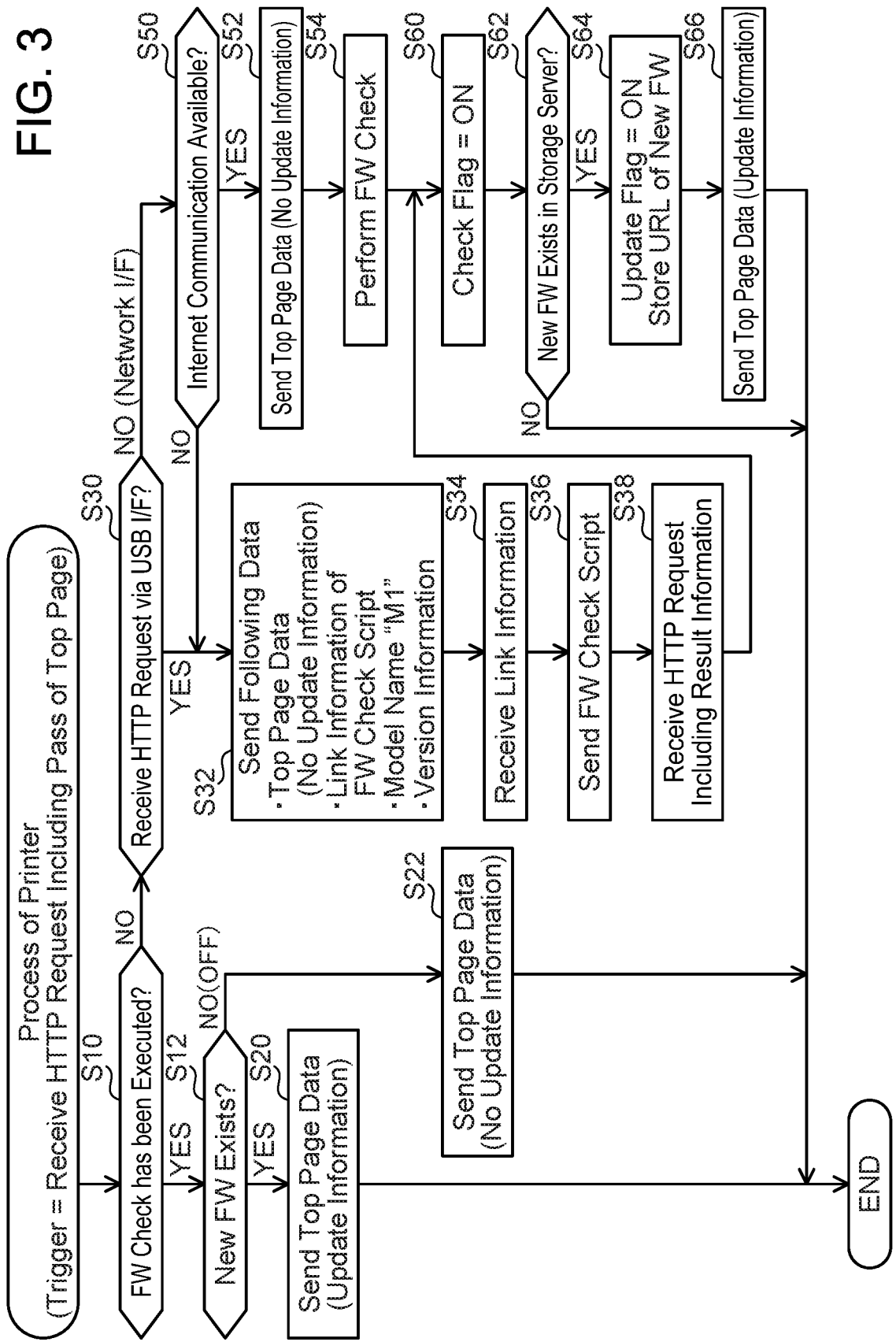
FIG. 3 shows a flowchart of a process of responding to a top page request.

(Processes by which Printer 10 Responds to Top Page Request; FIG. 3)

Figure 6:
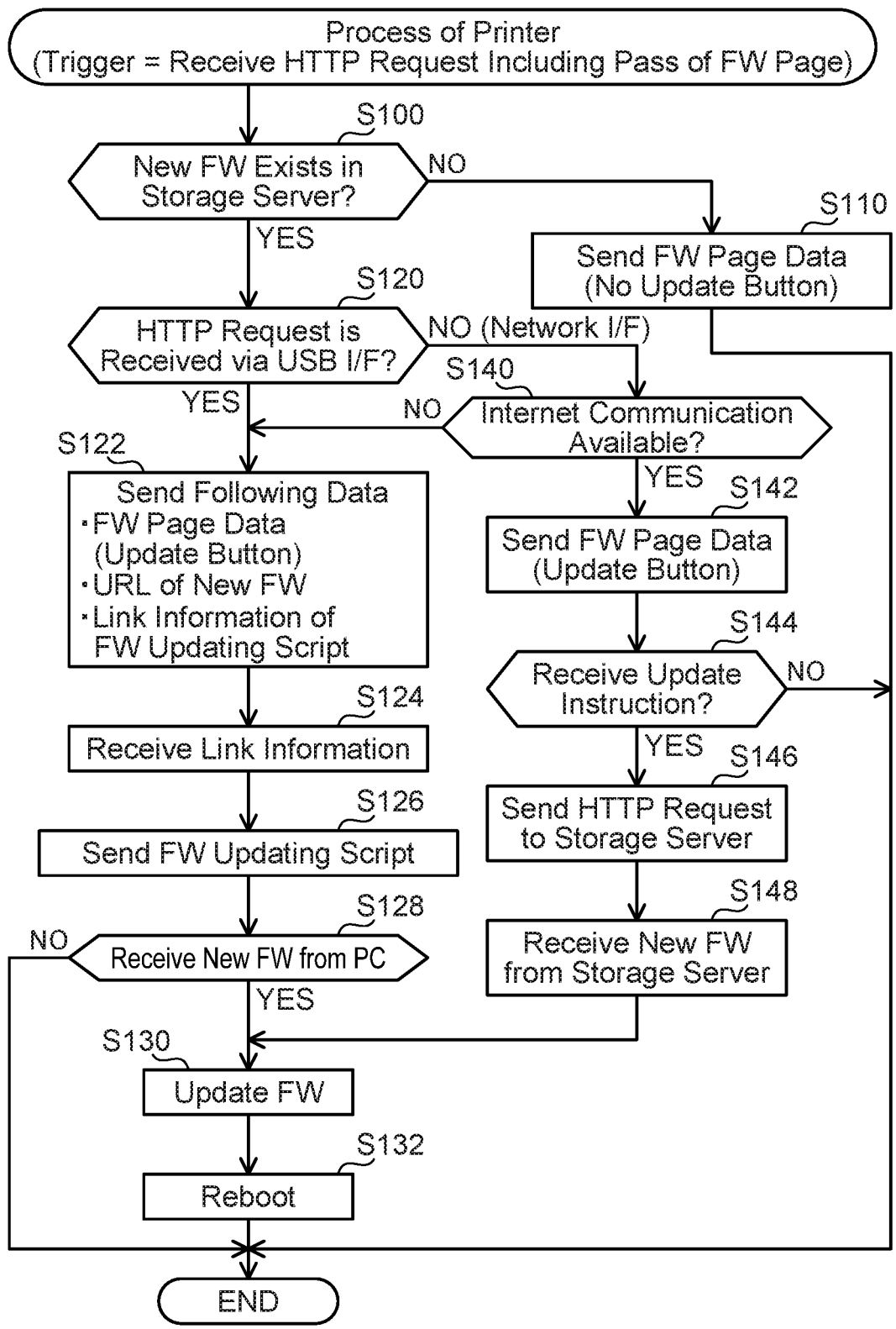
FIG. 6 shows a flowchart of a process of responding to a firmware page request.

To realize Cases X and Y as above, the CPU 32 of the printer 10 executes processes of FIGS. 3 and 6 according to the basic program in the ROM 40. FIG. 3 shows a flowchart of process executed by the CPU 32 upon when a top page of web pages which the printer 10 is capable of supplying. In a case of receiving a HTTP request including a pass of the top page from the PC 50 via the network I/F 20 or the USB I/F 22, the CPU 32 executes the process of FIG. 3. Hereinbelow, the I/F 20 or I/F 22 through which the HTTP request was received will be termed a "target interface".

In S10, the CPU 32 determines whether or not the FW check has been executed. Specifically, the CPU 32 determines that the FW check has been executed in a case where the check flag in the VRAM 44 indicates ON (YES to S10) and proceeds to S12, and determines that the FW check has not been executed in a case where the check flag indicates OFF (NO to S10) and proceeds to S30.

In S12, the CPU 32 determines whether or not the new FW is stored in the storage server 200. Specifically, the CPU 32 determines that the new FW is stored in the storage server 200 in a case where the update flag in the VRAM 44 indicates ON (YES to S12) and proceeds to S20, and determines that the new FW is not stored in the storage server 200 in a case where the update flag indicates OFF (NO to S12) and proceeds to S22.

In S20, the CPU 32 sends top page data including update information to the PC 50 through the target I/F. The top page data is data that represents the top page among the web pages which the printer 10 is capable of supplying, and is described in a HTML (abbreviation of Hyper Text Markup Language) which is interpretable by the browser program 52 of the PC 50. The update information is information for describing a letter string indicating that the new FW exists (hereinbelow termed an "update letter string") on the top page. Here, when the top page data is sent to the PC 50, the top page including the update letter string is displayed on the PC 50. The process of FIG. 3 ends when S20 is completed.

In S22, the CPU 32 sends the top page data not including the update information to the PC 50 through the target I/F. Due to this, the top page not including the update letter string is displayed on the PC 50. The process of FIG. 3 ends when S22 is completed.

In S30, the CPU 32 determines whether or not the target I/F is the USB I/F 22. In a case of determining that the target I/F is the USB I/F 22 (YES to S30) the CPU32 proceeds to S32, and in a case of determining that the target I/F is the network I/F 20 (NO to S30) the CPU32 proceeds to S50.

In S32, the CPU 32 sends the top page data not including the update information, link information of the FW check script, the model name "M1" of the printer 10, and version information indicating the current FW version in the NVRAM 42 to the PC 50 through the target I/F. Here, when the top page data is sent to the PC 50, the top page not including the update letter string is displayed on the PC 50. The link information is trigger information for sending the FW check script to the PC 50. The model name "M1" and the version information are used upon when the PC 50 executes the FW check.

In S34, the CPU 32 receives the link information sent in S32 from the PC 50 through the target I/F. In this case, in S36, the CPU 32 sends the FW check script including the URL of the update managing server 100 to the PC 50 through the target I/F (see (Y1) of FIG. 2). The FW check script is described by Java (registered trademark) script interpretable by the browser program 52 of the PC 50, and is information for causing the PC 50 to execute the FW check (see (Y2) of FIG. 2). Specifically, the FW check script is information interpreted by the browser program 52 for causing the PC 50 to execute (A) sending version information indicating the current FW version of the printer 10 to the update managing server 100, (B) receiving the result information indicating whether or not the storage server 200 stores the new FW for the printer 10 from the update managing server 100, and (C) sending the result information to the printer 10.

In S38, the CPU 32 receives the HTTP request including the result information indicating the result of the FW check from the PC 50 through the target I/F (see (Y3) of FIG. 2). In the case where the new FW for the printer 10 is stored in the storage server 200, the result information includes the URL of the new FW. On the other hand, in the case where the new FW is not stored in the storage server 200, the result information does not include the URL of the new FW and includes information indicating that the new FW does not exist. When S38 is completed, the CPU 32 proceeds to S60.

Here, a configuration of a comparative example will be assumed, in which sending the top page data corresponding to a content of the result information to the PC 50 after having received the HTTP request including the result information from the PC 50 without having sent the top page data in S32. In this configuration of the comparative example, a certain amount of time is required for the FW check executed by the PC 50, so a certain amount of time is required for the CPU 32 to receive the result information from the PC 50. Thus, the CPU 32 receives the result information after a certain amount of time and then sends the top page data to the PC 50. As a result, a certain amount of time is required in the PC 50 after having sent the HTTP request including the pass of the top page until the top page is displayed. Contrary to this, in the present embodiment, the CPU 32 firstly sends the top page data not including the update information in S32. Due to this, in the PC 50, an extra time required after having sent the HTTP request including the pass of the top page until when the top page is displayed can be prevented from occurring. After this, when the result information indicating that the new FW is stored in the storage server 200 is received from the PC 50 (S38), the CPU 32 sends the top page data including the update information to the PC 50 (see S66 to be described later). Due to this, the top page including the update letter string can be displayed on the PC 50 as a substitute of the top page not including the update letter string. In a variant, the CPU 32 may employ the configuration of the above comparative example.

As aforementioned, in the case where the target I/F is the network I/F 20, NO is determined in S30 and S50 is executed. In S50, the CPU 32 determines whether or not the printer 10 is capable of executing the Internet communication. Specifically, the CPU 32 sends a confirmation signal through the network I/F 20 with the URL "server100.com" of the update managing server 100 as a destination. In a situation where setting information for executing the Internet communication is stored in the memory 34, the CPU 32 receives a response signal to the confirmation signal from the update managing server 100, as a result of which it determines that the Internet communication can be executed (YES to S50), and proceeds to S52. On the other hand, in a situation where the setting information is not stored in the memory 34, the CPU 32 does not receive the response signal to the confirmation signal, as a result of which it determines that the Internet communication cannot be executed (NO to S50), and proceeds to S32.

In S52, the CPU 32 sends the top page data not including the update information to the PC 50 through the network I/F 20. Due to this, the top page not including the update letter string is displayed in the PC 50. As above, since the top page data is sent to the PC 50 before the FW check (see S54 to be described later) is executed, the extra time required after having sent the HTTP request including the pass of the top page until when the top page is displayed in the PC 50 can be prevented from occurring.

In S54, the CPU 32 executes the FW check (see (X1) of FIG. 2). Specifically, the CPU 32 sends the HTTP request including the URL "server100.com" of the update managing server 100, the model name "M1" of the printer 10, and the version information indicating the current FW version in the NVRAM 42 to the update managing server 100 through the network I/F 20. Then, the CPU 32 receives a response from the update managing server 100 through the network I/F 20. In the update managing server 100, in a case where the model name "M1" and a newer version than the current FW version are associated, the above response includes the URL associated with the model name "M1" (i.e., the URL indicating the storage location of the new FW in the storage server 200). On the other hand, in a case where the model name "M1" and the version matching the current FW version are associated in the update managing server 100, the above response does not include the URL of the new FW. When S54 is completed, the CPU 32 proceeds to S60.

In S60, the CPU 32 changes the check flag in the VRAM 44 from OFF to ON. Due to this, YES is determined in S10 when the HTTP request including the pass of the top page is received again from the PC 50 (trigger for the process of FIG. 3) and S12 to S22 are executed, so the PC 50 or the printer 10 does not need to execute the FW check again, and process load on the PC 50 or the printer 10 can be suppressed from becoming high. The check flag changed to ON in S60 may be changed to OFF at one of the following timings. In a first example, the check flag may be changed to OFF when power of the printer 10 is turned off and stored contents of the VRAM 44 are detected. In a second example, the check flag may be changed to OFF when a predetermined time has elapsed from when the check flag was set to ON without the power of the printer 10 being turned off.

In S62, the CPU 32 determines whether or not the new FW is stored in the storage server 200. In S62 that is executed after S38 has been executed, the CPU 32 determines that the new FW is stored (YES to S62) in a case where the result information received from the PC 50 in S38 includes the URL of the new FW and proceeds to S64, and determines that the new FW is not stored (NO to S62) in a case where the result information does not include the URL of the new FW, skips S64 and S66, and terminates the process of FIG. 3. Further, in S62 that is executed after S54 has been executed, the CPU 32 determines that the new FW is stored (YES to S62) in a case where the response received from the update managing server 100 in S54 includes the URL of the new FW and proceeds to S64, and determines that the new FW is not stored (NO to S62) in a case where this response does not include the URL of the new FW, skips S64 and S66, and terminates the process of FIG. 3.

In S64, the CPU 32 changes the update flag in the VRAM 44 from OFF to ON. Further, the CPU 32 stores the URL of the new FW in the VRAM 44.

In S66, the CPU 32 sends the top page data including the update information to the PC 50 through the target I/F. Due to this, in the PC 50, a state in which the top page not including the update letter string is displayed (see S32 or S52) is changed to a state in which the top page including the update letter string is displayed. When S66 is completed, the process of FIG. 3 is terminated.

Figure 4:
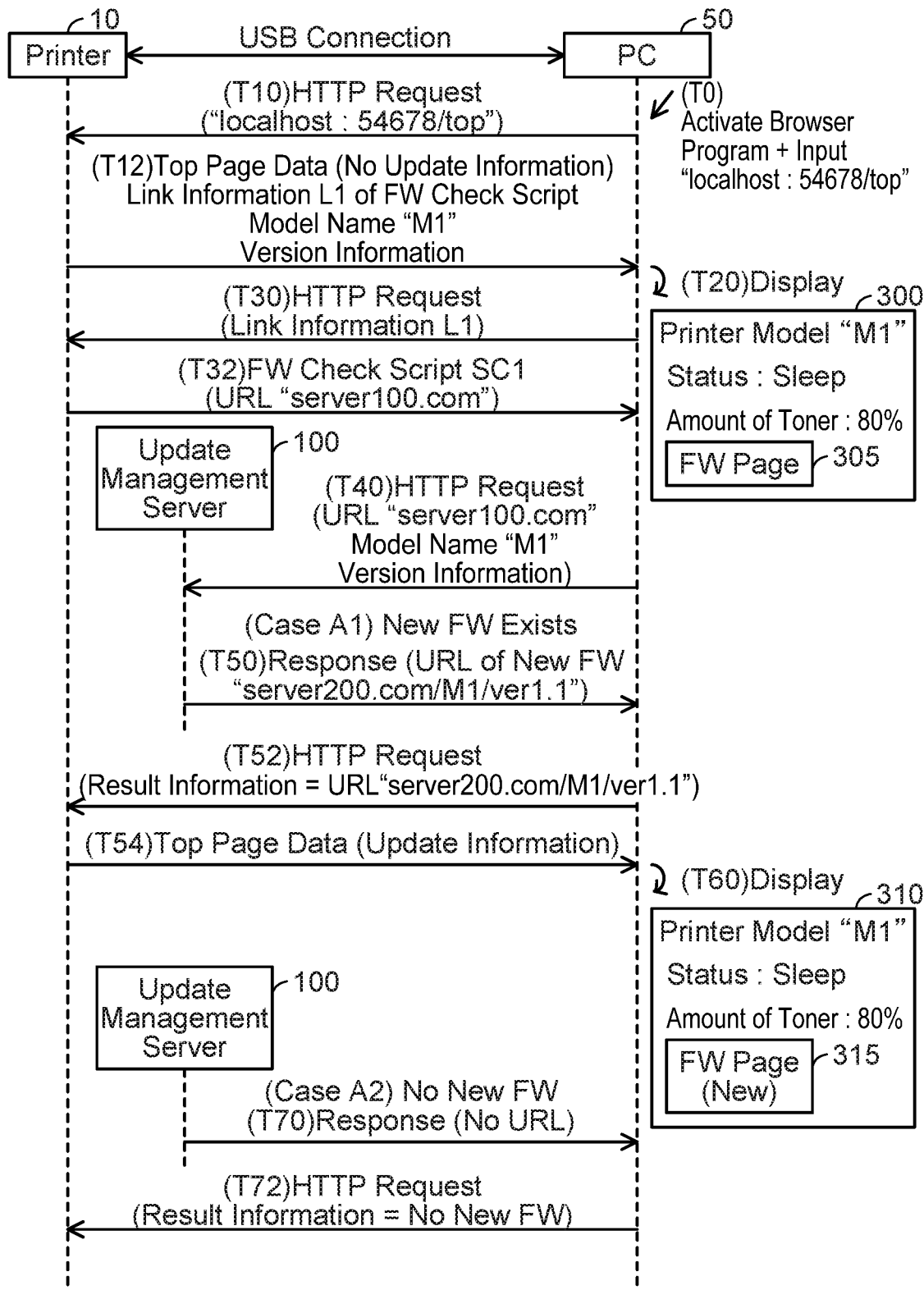
FIG. 4 shows Case A in which a top page is requested by a USB communication.
Figure 5:
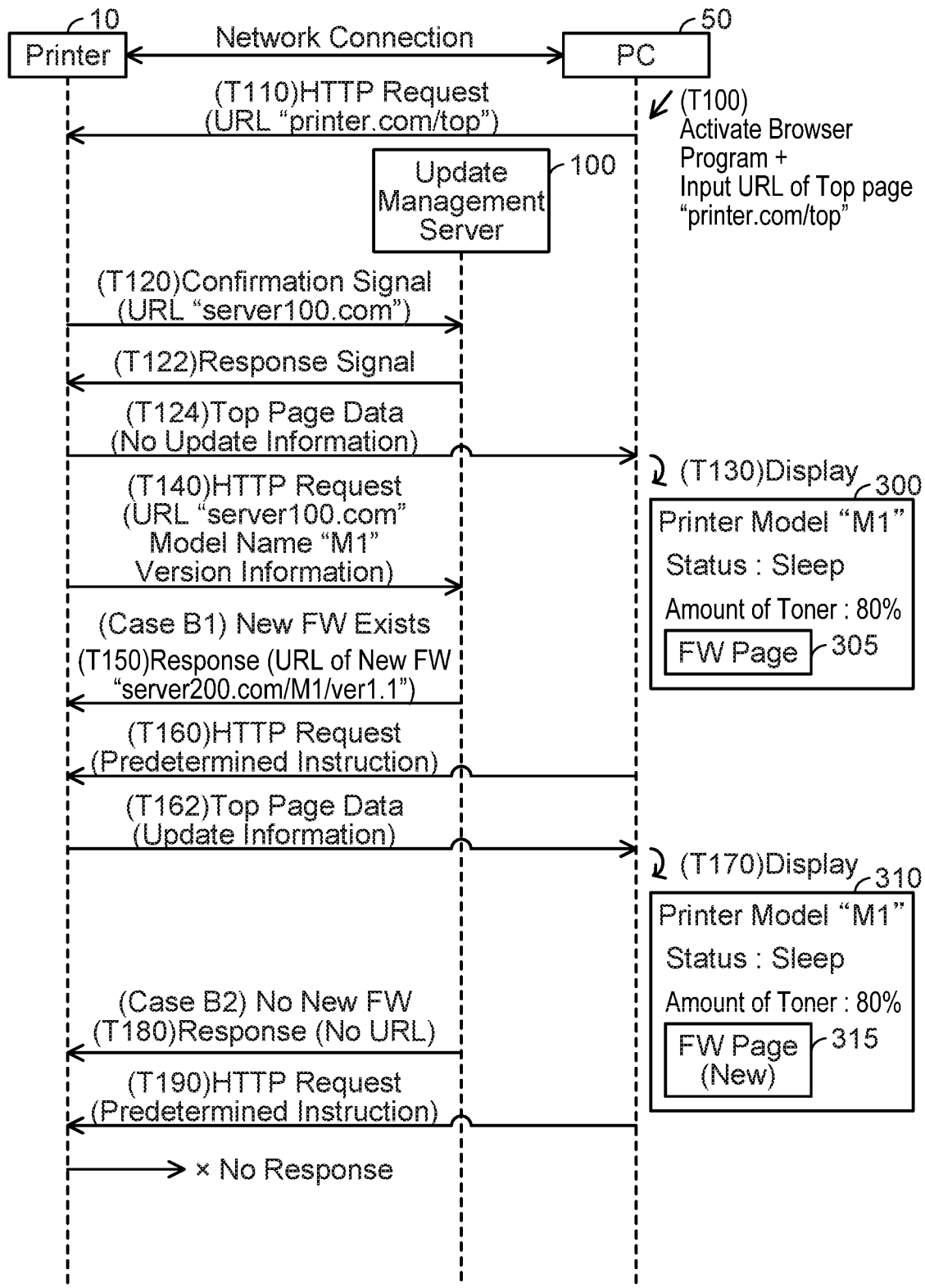
FIG. 5 shows Case B in which the top page is requested by a network communication.

(Specific Cases A and B; FIGS. 4 and 5)

Next, Cases A and B realized by the process of FIG. 3 will be described with reference to FIGS. 4 and 5. In an initial state of Cases A and B, the FW check has not yet been executed since the power of the printer 10 has been turned on, and the check flag and the update flag indicate OFF.

(Case A; FIG. 4)

In Case A of FIG. 4, the USB communication is executed between the printer 10 and the PC 50, and the printer 10 cannot execute the Internet communication. Following processes executed by the PC 50 in a state in which the browser program 52 is running (such as T10) are realized by an OS program that is not shown and the browser program 52. This applies similarly to FIGS. 5 and 7 to 9 described later.

At T0, the PC 50 accepts an operation to activate the browser program 52 and an operation to input a local loopback address "localhost:54678/top" of the PC 50 by the user. At T10, the PC 50 sends a HTTP request including the local loopback address "localhost:54678/top" inputted at T0 to the printer 10.

In this case, when the printer 10 receives the HTTP request from the PC 50 at T10 (trigger for the process of FIG. 3), it sends the top page data not including the update information, link information L1, the model name "M1", and the current FW version information to the PC 50 at T12 (NO to S10, YES to S30, and S32).

When the PC 50 receives the top page data from the printer 10 at T12, it displays a top page 300 at T20. The top page 300 includes information indicating the model name "M1" of the printer 10, information indicating a state of the printer 10 (such as a sleep state, a standby state, a print executing state, etc.), information indicating remaining amounts of consumable components (such as a toner or ink) of the printer 10, and a button 305 indicating a link to a FW page. Next, at T30, the PC 50 sends a HTTP request including the link information L1 to the printer 10.

When the printer 10 receives the link information L1 from the PC 50 at T30 (S34), it sends a FW check script SC1 to the PC 50 at T32 (S36). The scrip SC1 includes the URL "server100.com" of the update managing server 100.

When the PC 50 receives the script SC1 from the printer 10 at T32, it executes the FW check in accordance with the script SC1. Specifically, at T40, the PC 50 sends a HTTP request including the URL "server100.com" in the script SC1, the model name "M1" received at T12, and the version information" received at T12 to the update managing server 100. In this case, either Case A1 or Case A2 as below is realized according to the current FW version of the printer 10 (i.e., the version information at T12).

In Case A1, the current FW version is "1.0" and the storage server 200 stores the FW of newer version "1.1" (see FIG. 1). Further, the update managing server 100 stores the version information indicating the new FW version "1.1" and the URL of the new FW "server200.com/M1/ver1.1" in association with the model name "M1" (see FIG. 1). When the update managing server 100 receives the HTTP request from the PC 50 at T40, it determines that the version information "1.1" stored in association with the model name "M1" included in this HTTP request is newer than the version information "1.0" included in this HTTP request, and sends a response indulging the URL "server200.com/M1/ver1.1" to the PC 50 at T50.

When the PC 50 receives the response from the update managing server 100 at T50, it sends a HTTP request including result information indicating the URL "server200.com/M1/ver1.1" in the response to the printer 10 at T52.

When the HTTP request is received from the PC 50 at T52 (S38), the printer 10 determines that the result information in this HTTP request includes the URL of the new FW (YES to S62), and sends the top page data including the update information to the PC 50 (S66).

When the PC 50 receives the top page data from the printer 10 in T54, it displays a top page 310 as a substitute of the top page 300 at T60. The top page 310 differs from the top page 300 in that it includes a button 315 indicating the update letter string "New". Due to this, the user can acknowledge of the presence of the new FW for the printer 10.

On the other hand, in Case A2, the current FW version of the printer 10 is "1.1". In this case, when the update managing server 100 receives the HTTP request from the PC 50 at T40, it determines that the version information "1.1" stored in association with the model name "M1" included in this HTTP request is not newer than the version information "1.1" included in this HTTP request, and sends a response not including the URL "server200.com/M1/ver1.1" to the PC 50 at T70.

When the PC 50 receives the response from the update managing server 100 at T70, it sends a HTTP request including result information indicating that the new FW does not exist to the printer 10 at T72.

When the printer 10 receives the HTTP request from the PC 50 at T72 (S38), it determines that the result information in the HTTP request does not include the URL of the new FW (NO to S62), and terminates the process. In this case, in the PC 50, the top page 310 is not displayed as the substitute of the top page 300, and the display of the top page 300 is continued.

(Case B; FIG. 5)

In Case B of FIG. 5, the network communication is executed between the printer 10 and the PC 50, and the printer 10 is capable of executing the Internet communication.

T100 is similar to T0 of FIG. 4. At T110, the PC 50 sends a HTTP request to the printer 10 including the URL "printer.com/top" inputted at T100. Unlike the USB communication at T10 of FIG. 4, the local loopback address is not used in the network communication at T110, and the URL is used as it is.

When the printer 10 receives the HTTP request from the PC 50 at T110 (trigger for the processes of FIG. 3), it sends a confirmation signal to the update managing server 100 at T120 with the URL "server100.com" as a destination (NO to S10, NO to S30, and S50 of FIG. 3). In this case, since the printer 10 is capable of executing the Internet communication, it receives a response signal from the update managing server 100 at T122 (YES to S50). In this case, at T124, the printer 10 sends the top page data not including the update information to the PC 50 (S52). Due to this, at T130, the top page 300 is displayed on the PC 50.

At T140, the printer 10 executes the FW check (S54). Specifically, the printer 10 sends a HTTP request including the URL "server100.com", the model name "M1", and the version information indicating the current FW version to the update managing server 100. Either Case B1 or Case B2 as below is realized according to this version information.

In Case B1, the current FW version of the printer 10 is "1.0", similar to Case A1 of FIG. 4. Due to this, at T150, the printer 10 receives a response including the URL "server200.com/M1/ver1.1" from the update managing server 100. Due to this, the printer 10 can acknowledge the presence of the new FW (YES to S62).

Although not shown, the printer 10 has already sent a script for sending a HTTP request including a predetermined instruction to the PC 50 at T124. Thus, after having displayed the top page 300 at T130, the PC 50 sends a HTTP request according to this script to the printer 10 at T160. The predetermined instruction is an instruction for requesting a new top page 310.

When the printer 10 receives the HTTP request from the PC 50 at T160, it sends the top page data including the update information to the PC 50 at T162 (S66). Due to this, at T170, the top page 310 is displayed on the PC 50 as the substitute of the top page 300.

In Case B2, the current FW version of the printer 10 is "1.1", similar to Case A2 of FIG. 4. Due to this, at T180, the printer 10 receives a response not including the URL of the new FW from the update managing server 100. Due to this, the printer 10 can acknowledge that the new FW does not exist (NO to S62). In this case, the printer 10 does not send the top page data including the update information to the PC 50 even if the HTTP request including the predetermined instruction is received from the PC 50 at T190. Due to this, the top page 300 continues to be displayed on the PC 50.

(Processes for Printer 10 to Respond to FW Page Request; FIG. 6)

Next, a flowchart of processes executed by the CPU 32 upon when the FW page is requested is shown with reference to FIG. 6. The processes in FIG. 6 are initiated with a HTTP request including the pass for the FW page being received as a trigger. In a case where the button 305 or 315 included in the top page 300 or 310 of FIG. 4 or 5 is selected, the CPU 32 receives the HTTP request including the pass for the FW page from the PC 50 through the network I/F 20 or the USB I/F 22, and executes S100. Hereinbelow, the I/F 20 or 22 through which the HTTP request was received will be termed a "target interface".

In S100, the CPU 32 determines whether or not the new FW is stored in the storage server 200. As aforementioned, when it is confirmed that the new FW is stored in the storage server 200 as a result of the FW check, the update flag in the VRAM 44 is changed from OFF to ON in S64 of FIG. 3. The CPU 32 determines YES to S100 in a case where the update flag indicates ON and proceeds to S120, and determines NO to S100 in a case where the update flag indicates OFF and proceeds to S110.

In S110, the CPU 32 sends FW page data not including the update button to the PC 50 through the target I/F. The FW page data is data representing the FW page among the web pages which the printer 10 is capable of supplying, and is described in HTML. Here, when the FW page data is sent to the PC 50, a FW page not including the update button is displayed on the PC 50. When S110 is completed, the processes of FIG. 6 are terminated.

S120 and S140 are similar to S30 and S50 of FIG. 3. The CPU 32 proceeds to S122 in a case of YES to S120, proceeds to S142 in a case of YES to S140, and proceeds to S122 in a case of NO to S140.

In S122, the CPU 32 sends FW page data including the update button, the URL of the new FW stored in S64 of FIG. 3, and the link information of the FW update script to the PC 50 through the target I/F (see (Y4) of FIG. 2). Here, when the FW page data is sent to the PC 50, a FW page including the update button is displayed on the PC 50. The link information is trigger information for sending the FW update script to the PC 50.

In S124, the CPU 32 receives the link information from the PC 50 sent in S122 through the target I/F. In this case, in S126, the CPU 32 sends the FW update script to the PC 50 through the target I/F (see (Y4) of FIG. 2). The FW update script is described in JavaScript. The FW update script is information to be interpreted by the browser program 52 for causing the PC 50 to execute (A) receiving the new FW from the storage server 200 in response to the update button in the FW page being selected (see (Y5) of FIG. 2) and (B) sending this new FW to the printer 10 (see (Y6)).

In S128, the CPU 32 determines whether or not the new FW is received from the PC 50 through the target I/F. In a case of receiving the new FW from the PC 50 (see (Y6) of FIG. 2), the CPU 32 determines YES to S128 and proceeds to S130. On the other hand, in a case of not receiving the new FW from the PC 50, for example, in a case of receiving a HTTP request including a pass for another web page from the PC 50, the CPU 32 determines NO to S128 and terminates the processes of FIG. 6.

As aforementioned, in the case where the target I/F is the network I/F 20 and the printer 10 is capable of executing the Internet communication, S142 is thereby executed. In S142, the CPU 32 sends the FW page data including the update button to the PC 50 through the network I/F 20. As a result, the FW page including the update button is displayed on the PC 50.

In S144, the CPU 32 determines whether or not an update instruction is received from the PC 50 through the network I/F 20. The update instruction is an instruction that is sent from the PC 50 to the printer 10 when the update button in the FW page is selected. In a case of receiving the update instruction from the PC 50, the CPU 32 determines YES to S144 and proceeds to S146. On the other hand, in a case of not receiving the update instruction from the PC 50, for example, in the case of receiving a HTTP request including a pass for another web page from the PC 50, the CPU 32 determines NO to S144 and terminates the processes of FIG. 6.

In S146, the CPU 32 sends a HTTP request including the URL of the new FW stored in S64 of FIG. 3 to the storage server 200 through the network I/F 20. Due to this, in S148, the CPU 32 receives the new FW from the storage server 200 through the network I/F 20 (see (X2) of FIG. 2). When S148 is completed, the CPU 32 proceeds to S130.

In S130, the CPU 32 updates the current FW in the NVRAM 42 to the new FW received in S128 or S148. The update herein may be executed by writing the new FW after having erased the current FW, or may overwrite the new FW without deleting the current FW.

In S132, the CPU 32 executes reboot of the printer 10. That is, the CPU 32 turns off the power of the printer 10 and turns it back on again. Due to this, the CPU 32 can suitably execute processes using the new FW. Here, since the power of the printer 10 is turned off, the stored contents of the VRAM 44 are erased, as a result of which the check flag and the update flag are initialized to their off states. When S132 is completed, the CPU 32 terminates the processes of FIG. 6.

Figure 7:
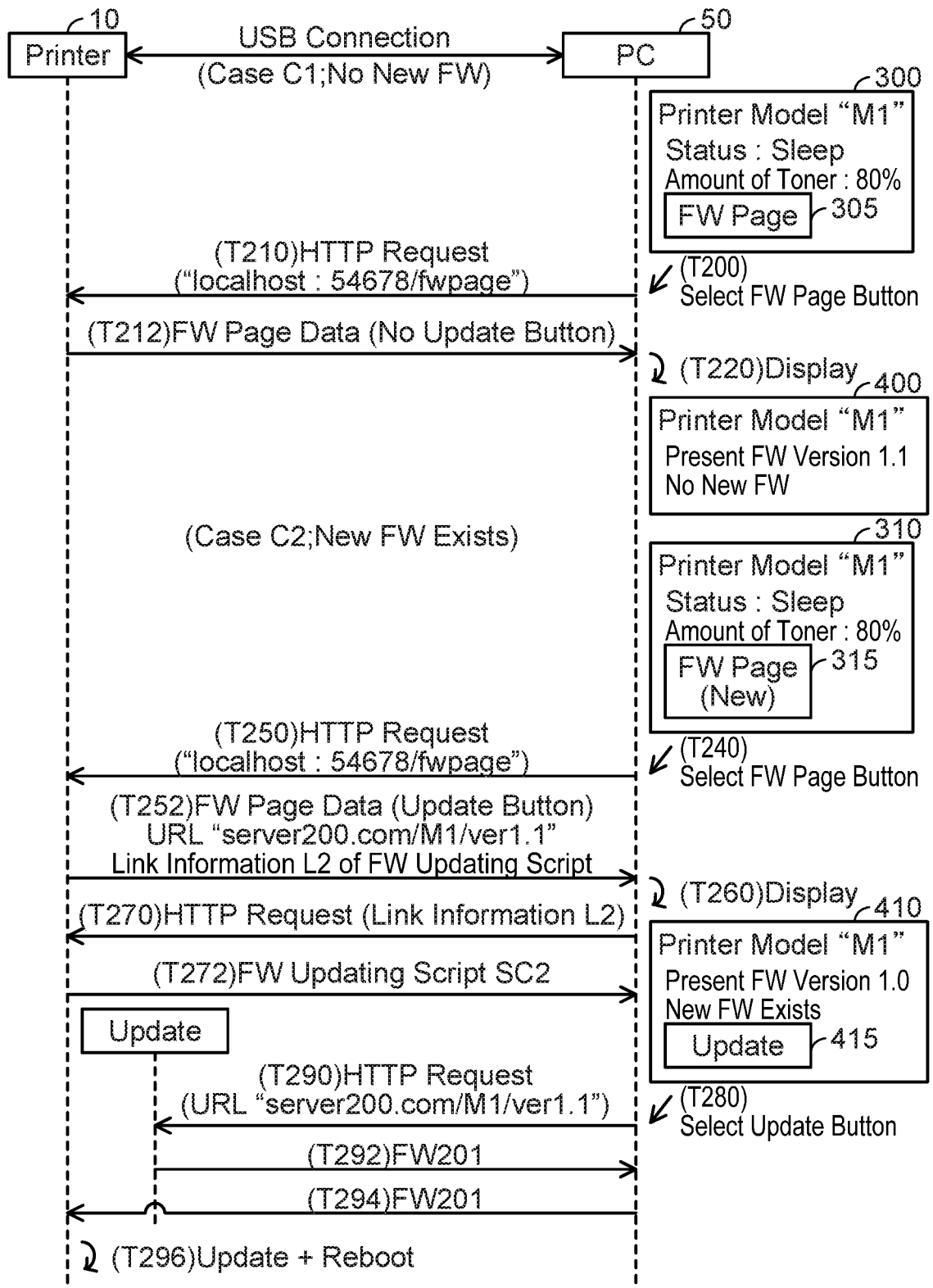
FIG. 7 shows Case C in which a firmware page is requested by a USB communication.

(Specific Cases C and D; FIGS. 7 and 8)

Next, Cases C and D realized by the processes of FIG. 6 will be described with reference to FIGS. 7 and 8. Case C of FIG. 7 is a case continued from Case A1 or A2 of FIG. 4, and Case D of FIG. 8 is a case continued from Case B1 of FIG. 5.

(Case C; FIG. 7)

Case C1 is a case continued from Case A2 of FIG. 4, that is, a case in which the new FW was confirmed as not existing in the FW check. In this case, the update flag in the VRAM 44 indicates OFF. This is because NO was determined to S62 in FIG. 3 and S64 was not executed.

At T200, the PC 50 accepts the operation from the user selecting the button 305 included in the top page 300 displayed at T20 of FIG. 4. In this case, at T210, the PC 50 sends a HTTP request including a local loopback address "localhost:54678" and a pass "fwpage" of the FW page to the printer 10.

When the printer 10 receives the HTTP request from the PC 50 at T210 (trigger for the processes of FIG. 6), it sends the FW page data not including the update button to the PC 50 at T212 (NO to S100, S110).

When the PC 50 receives the FW page data from the printer 10 at T212, it displays a FW page 400 at T220. The FW page 400 is a page for displaying information related to the FW of the printer 10, and includes information indicating the model name "M1", information indicating the current FW version, and information indicating that the new FW does not exist. Due to this, the user can acknowledge the current FW version, and further can acknowledge that the new FW does not exist (i.e., updating the FW is not necessary).

On the other hand, Case C2 is a case continued from Case A1 of FIG. 4, that is, a case in which the new FW was confirmed as existing in the FW check. In this case, the update flag in the printer 10 indicates ON. This is because YES was determined to S62 in FIG. 3 and S64 was executed.

At T240, the PC 50 accepts the operation from the user selecting the button 315 included in the top page 310 displayed at T60 of FIG. 4. In this case, at T250, the PC 50 sends the HTTP request to the printer 10 similar to T210 as aforementioned.

When the printer 10 receives the HTTP request from the PC 50 at T250 (trigger for the processes of FIG. 6), it sends the FW page data including the update button, the URL "server200.com/M1/ver1.1" of the new FW, and link information L2 to the PC 50 at T252 (YES to S100, YES to S120, S122).

When the PC 50 receives the FW page data and the like from the printer 10 at T252, it displays a FW page 410 at T260. The FW page 410 differs from the FW page 400 in that it includes information indicating that the new FW exists and an update button 415. Due to this, the user can acknowledge that the new FW exists (i.e., updating the FW is necessary). Next, at T270, the PC 50 sends a HTTP request including the link information L2 to the printer 10.

When the printer 10 receives the link information L2 from the PC 50 at T270 (S124), it sends a FW update script SC2 to the PC 50 at T272 (S126).

At T280, the PC 50 accepts an operation from the user selecting the update button 415 included in the FW page 410. In this case, the PC 50 sends a HTTP request including the URL "server200.com/M1/ver1.1" (see T252) to the storage server 200 at T290 according to the script SC2, receives a FW 201 stored at a location indicated by the URL from the storage server 200 at T292, and sends the FW 201 to the printer 10 at T294.

When the printer 10 receives the FW 201 from the PC 50 at T294 (YES to S128), it updates the current FW to the FW201 at T296 (S130), and executes reboot (S132).

(Case D; FIG. 8)

Next, a continuation of Case B1 of FIG. 5 will be described with reference to FIG. 8. At T300, the PC 50 accepts an operation by the user selecting the button 315 included in the top page 310 displayed at T170 of FIG. 5. In this case, at T310, the PC 50 sends a HTTP request including a URL "printer.com/fwpage" of a FW page to the printer 10.

When the printer 10 receives the HTTP request from the PC 50 at T310 (trigger for processes of FIG. 6), it sends a confirmation signal to the storage server 200 with the URL "server200.com" as a destination at T320 (YES to S100, NO to S120, S140 of FIG. 6). In this case, since the printer 10 is capable of executing the Internet communication, it receives a response signal from the storage server 200 at T322 (YES to S140). In this case, at T330, the printer 10 sends the FW page data including the update button to the PC 50 (S142). Due to this, at T340, the FW page 410 is displayed on the PC 50.

At T350, the PC 50 accepts the operation from the user selecting the update button 415 included in the FW page 410. In this case, at T360, the PC 50 sends a HTTP request including the update instruction to the printer 10.

When the printer 10 receives the HTTP request from the PC 50 at T360 (YES to S144), it sends a HTTP request including the URL "server200.com/M1/ver1.1" of the new FW to the storage server 200 at T370 (S146), and at T372, it receives the FW 201 stored at the location indicated by the URL from the storage server 200 (S148). Then, at T374, the printer 10 updates the current FW to the FW201 (S130), and executes reboot (S132).

(Effects of Present Embodiment)

As aforementioned, in Case A of FIG. 4 and Case C of FIG. 7, the printer 10 sends the FW check script SC1 to the PC 50 (T32 of FIG. 4), and further sends the URL of the new FW and the FW update script SC2 to the PC 50 (T252, T272 of FIG. 7). As a result, the printer 10 causes the PC 50 to execute the FW check (T40, T50, T70 of FIG. 4), can receive the result information from the PC 50 (T52, T72), and further can cause the PC 50 to execute receiving the new FW from the storage server 200 and sending this FW to the printer 10 (T290 to T294 of FIG. 7). Thus, the printer 10 can suitably receive the result information of the FW check without communicating with the update managing server 100 and the storage server 200 to update the FW, and further, it can suitably receive the new FW.

Especially, the printer 10 sends the scripts SC1, SC2 described in JavaScript which are interpretable by the browser program 52 of the PC 50 to the PC 50 (T32 of FIG. 4, T272 of FIG. 7). Due to this, even if the PC 50 does not store a dedicated application for executing the respective processes of the FW check, receiving the new FW from the storage server 200, and sending the FW to the printer 10, the PC 50 can use the general browser program 52 to execute the above processes.

Further, the script SC1 includes the URL of the update managing server 100 (see T32 of FIG. 4). Thus, even if the user does not input the URL to the PC 50, the CP 50 can use the URL included in the script SC1 to execute the FW check. Further, the printer 10 sends the URL of the new FW to the PC 50 (T252 of FIG. 7). Thus, even if the user does not input the URL to the PC 50, the CP 50 can use the URL to receive the new FW from the storage server 200. Since the user does not have to input the URL of the update managing server 100 and the URL of the new FW, user convenience can be improved.

Further, when the user of the PC 50 wishes to access a web server of the printer 10, normally, the user accesses a top page at first. Upon when the printer 10 receives the HTTP request including the pass of the top page, which is highly likely to be initially accessed, it causes the PC 50 to execute the FW check while the top page 300 is being displayed on the PC 50 by sending the link information L1 together with the top page data to the PC 50 (T12 of FIG. 4). Due to this, the printer 10 can cause the PC 50 to execute the FW check promptly. Especially, in the case where the printer 10 came to know that the new FW exists as the result of the FW check (see Case A1 of FIG. 4), it causes the PC 50 to display the top page 310 including the update letter string "New". Since such information is displayed on the top page 310, the presence of the new FW can be notified promptly to the user.

Further, in Case A of FIG. 4 and Case C of FIG. 7, the printer 10 is capable of executing the USB communication with the PC 50. As above, in the situation where the printer 10 receives the HTTP request from the PC 50 by using the USB communication (T10 of FIG. 4, T250 of FIG. 7), the printer 10 is highly likely not connected to the LAN 4 and cannot execute the Internet communication. This is because, if the printer 10 is connected to the LAN 4, the network communication can be executed by the printer 10 and the PC 50, so the printer 10 and the PC 50 do not need to be connected by the USB cable. Thus, in the case where the printer 10 receives the HTTP request from the PC 50 by using the USB communication, it sends the FW check script SC1, the URL of the new FW, and the FW update script SC2 to the PC 50 (T32 of FIG. 4, T252, T272 of FIG. 7). Due to this, the printer 10 can suitably receive the result information of the FW check and the new FW even in the situation where the Internet communication cannot be executed.

On the other hand, in Case B of FIG. 5 and Case D of FIG. 8, the printer 10 is capable of executing the network communication with the PC 50. In the case where the printer 10 receives the HTTP request from the PC 50 using the network communication (T110 of FIG. 5, T310 of FIG. 8), it determines whether or not the Internet communication can be executed (T120, T122 of FIG. 5, T320, T322 of FIG. 8). Then, in the case of determining that the Internet communication can be executed, the printer 10 executes the FW check (T140 of FIG. 5), and further receives the new FW from the storage server 200 (T370, T372 of FIG. 8). In this case, the PC 50 can be free from the execution of the FW check, the receiving of the new FW from the storage server 200, and the sending of this FW to the printer 10, so processing load on the PC 50 can be suppressed from becoming high.

In Cases B and D as above, the situation is assumed in which the printer 10 is capable of executing the Internet communication. As an alternative to this, in a situation where the printer 10 cannot execute the Internet communication (for example, in a situation where the setting information for executing the Internet communication is not stored), the printer 10 does not receive the response signal even if the confirmation signal is sent at T120 of FIG. 5 or T320 of FIG. 8 (NO to S50 of FIG. 3, NO to S140 of FIG. 6). As a result, the printer 10 uses the network communication to execute the processes of T12 and thereafter in FIG. 4 and T252 and thereafter of FIG. 7 (S32 to S36, S38, S66 of FIG. 3, S122 to S128 of FIG. 6). In this case, same effects as those of Cases A and C as above can be achieved.

(Corresponding Relationships)

The printer 10, the PC 50, the storage server 200, and the update managing server 100 are respectively an example of a "communication device", a "terminal device", a "first server", and a "second server". The network I/F 20 and the USBI/F 22 are respectively an example of a "first communication interface" and a "second communication interface". The NVRAM 42, the current FW, the new FW, and the URL of the new FW are respectively an example of a "memory", "setting data", "update data", and "URL". The current FW version 1.0 and the new FW version 1.1 are respectively an example of a "first version" and a "second version". The FW update script SC2 and the FW check script SC1 are respectively an example of "first program" and "second program". The HTTP request at T370 of FIG. 8 is an example of a "first request". The HTTP requests at T210, T250 of FIG. 7 and T310 of FIG. 8 are examples of a "second request".

S122 (and S126), S128, S130 taking place after S128, S140, S146, S148, and S130 taking place after S148 of FIG. 6 are respectively an example of "sending of URL and first program", "receiving of the update data from the terminal device", "updating of the setting data stored in the memory by using the update data received from the terminal device", "determining whether the communication device is capable of communicating with the first server", "sending of a first request", "receiving of the update data from the first server", and "updating of the setting data stored in the memory by using the update data received from the first server". T290 (and T292), T294 of FIG. 7 are respectively an example of "an update data receiving process" and "an update data sending process". S32 (and S36), S38 of FIG. 3 are respectively an example of "sending of first version information indicating the first version and second program" and "receiving of the result information". T40, T50 (or T70), T52 (or T72) of FIG. 4 are respectively an example of "a version information sending process", "a result information receiving process", and "a result information sending process".

Second Embodiment

In the present embodiment, the contents of the FW check script sent in S36 of FIG. 3 are different from the first embodiment. Specifically, the FW check script is information that is interpreted by the browser program 52 to cause the PC 50 to execute (A) sending the version information indicating the current FW version to the update managing server 100, (B) receiving the version information indicating the newest FW version stored in the storage server 200 from the update managing server 100, (C) determining whether or not the newest FW version is newer than the current FW version, and (D) sending the result information indicating the result of this determination to the printer 10. That is, in the first embodiment, the update managing server 100 determined whether or not the new FW exists, however, in this embodiment, the PC 50 executes this determination. Other processes are similar to the first embodiment.

(Specific Case; FIG. 9)

A specific case of the present embodiment will be described with reference to FIG. 9. An initial state of the case of FIG. 9 is same as the initial state of Case A of FIG. 4. T410 to T432 are similar to T10 to T32 of FIG. 4.

At T440, in accordance with the FW check script SC1, the PC 50 sends the HTTP request including the URL "server100.com" in the script and the model name "M1" received at T412 to the update managing server 100 (S36 of FIG. 3). This HTTP request differs from the HTTP request of T40 of FIG. 4 in that it does not include the version information. Then, at T442, the PC 50 receives the version information "ver1.1" and the URL "server200.com/M1/ver1.1" associated with the model name "M1" from the update managing server 100. Then, at T450, the PC 50 determines whether or not the version information "ver1.1" received at T442 is newer than the current version information received at T412.

In the case of determining that the version information "ver1.1" is newer than the current version information (YES at T450), the PC 50 sends the HTTP request to the printer 10 at T452 including the result information indicating the URL received at T442. T454 and T460 thereafter are similar to T54 and T60 of FIG. 4.

On the other hand, in the case of determining that the version information "ver1.1" is not newer than the current version information (NO at T450), the PC 50 sends the HTTP request at T470 including the result information indicating that the new FW does not exist to the printer 10.

In the present embodiment as well, the printer 10 can achieve the same effects as those of the first embodiment. In the present embodiment, T442, T450, T452 (or T470) are respectively an example of "a version information receiving process", "a determining process", and "a result information sending process".

(Variant 1) The NVRAM 42 may store for example a color profile instead of the FW. In this case, the printer 10 executes a color conversion on image data by using the color profile to generate print data interpretable by the print executing unit 16. The storage server 200 may store a newest color profile. Further, the printer 10 may send a script for causing the PC 50 to execute receiving the newest color profile from the storage server 200 and sending the newest color profile to the printer 10 to the PC 50. In this case, the printer 10 can update a current color profile in the NVRAM 42 to the newest color profile received from the PC 50. In this variant, the color profile is an example of "setting data". Further, in another variant, the "setting data" may be default print setting data indicating default print settings (such as color number, print resolution, paper size, etc.).

(Variant 2) The storage server 200 may store a program for updating the FW (such as a program indicating an equation for changing a certain value included in the current FW to another value) instead of storing the FW itself. In this case, in the case of receiving this program at S128 or S148 of FIG. 6, the printer 10 updates the FW in S130 by using this program. In this variant, this program is an example of "update data". Generally speaking, "updating of the setting data stored in the memory by using the update data received from the terminal device (or updating of the setting data stored in the memory by using the update data received from the first server)" may simply update the setting data using the update data. Further, here, "by using the received update data" may for example be expressed as "using the update data received without executing a communication using the received update data with another device".

(Variant 3) Each of the scripts SC1, SC2 may be data described in a different type of script from the JavaScript (such as Action script, VB (abbreviation of Visual Basic) script, XUL (abbreviation of XML User interface Language), etc.), so long as it can be interpreted by the browser program 52. Further, in another variant, the printer 10 may send information that is of a different type from a script (such as Java applet), which is information interpretable by the browser program 52, to the PC 50. Generally speaking, "first (or second) program" simply needs to be information interpretable by a browser program.

(Variant 4) The update managing server 100 and the storage server 200 may be configured integrally. In this variant, a "second server" is a same server as a "first server".

(Variant 5) The printer 10 may send the FW check script itself to the PC 50 instead of sending the link information of the FW check script to the PC 50 in S32 of FIG. 3. In this case, S34 and S36 may be omitted. Further, the printer 10 may send the FW check script itself to the PC 50 instead of sending the link information of the FW check script to the PC 50 in S122 of FIG. 6. In this case, S124 and S126 may be omitted. Especially in this case, the printer 10 does not have to send the FW update script and the URL of the new FW as separate information in S122 to the PC 50, and instead a FW update script in which the URL of the new FW is described may be sent to the PC 50. Generally speaking, "sending of URL and first program" at least needs to send the URL and the first program to a terminal device.

(Variant 6) The printer 10 may not be provided with the USB OF 22. In this case, S30 of FIG. 3 and S120 of FIG. 6 may be omitted. In this variant, a "second communication interface" may be omitted.

(Variant 7) In S50 of FIG. 3 and S140 of FIG. 6, instead of sending the confirmation signal to the server 100 or 200, the printer 10 may determine whether or not the setting information for executing the Internet communication is stored in the memory 34, determine YES in a case where the setting information is stored, and determine NO in a case where the setting information is not stored. Generally speaking, "determining whether the communication device is capable of communicating with the first server" simply needs to determine whether or not the communication device is capable of communicating with the first server.

(Variant 8) In a case of setting a premise that the printer 10 is capable of executing the Internet communication in the situation where the printer 10 is capable of executing the network communication, S140 of FIG. 6 may be omitted. That is, the printer 10 may proceed to S142 without executing S140 in the case of NO to S120. In this variant, "determining whether the communication device is capable of communicating with the first server" may be omitted.

(Variant 9) In the situation where the printer 10 is capable of executing the Internet communication, S122 to S132 may be executed without executing S140 to S148. That is, in the case of YES to S100, the printer 10 may proceeds to S122 without executing S120 and S140. In this case, S120, S140 to S148 of FIG. 6 may be omitted. In this variant, "determining whether the communication device is capable of communicating with the first server", "sending of a first request", "receiving of the update data from the first server",
and "updating of the setting data stored in the memory by using the update data received from the first server" may be omitted.

(Variant 10) The printer 10 may not be provided with the network I/F 20. In this case, S120, S140 to S148 of FIG. 6 may be omitted. In this variant, "a first communication interface", "determining whether the communication device is capable of communicating with the first server", "sending of a first request", "receiving of the update data from the first server", and "updating of the setting data stored in the memory by using the update data received from the first server" may be omitted.

(Variant 11) In the first variant, the "second communication interface" may be an I/F for executing communication using Bluetooth (registered trademark) instead of the USB I/F 22. In the embodiments and the first variant as above, the "first communication interface" and the "second communication interface" may respectively be expressed as "an I/F capable of executing a communication using TCP/IP" and "an I/F incapable of executing a communication using TCP/IP". In the second variant, the "first communication interface" may be a wireless I/F for executing a wireless communication with the PC 50 through an access point, and the "second communication interface" may be a wireless I/F for executing a wireless communication with the PC 50 without using the access point (such as a wireless communication using Wi-Fi Direct or SoftAP). In the second variant, two wireless I/Fs may be configured integrally in one chipset, and in this case, a MAC address allocated to the first communication interface and a MAC address allocated to the second communication interface are different. In the embodiments and the first and second variants, the "first communication interface" and the "second communication interface" may respectively be expressed as "an I/F capable of executing the Internet communication" and "an I/F incapable of executing the Internet communication".

(Variant 12) In the case of determining YES to S62 of FIG. 3, the printer 10 may automatically execute the processes of FIG. 6 even if the operation of selecting the button 305 or 315 included in the top page 300 or 310 is not performed by the user.

(Variant 13) The FW check may not be executed while the top page is being displayed in the PC 50, and the FW check may be executed upon when the FW page is to be displayed on the PC 50. In this case, in the case of receiving the HTTP request including the pass of the top page, the printer 10 sends the top page data not including the update information to the PC 50 instead of the processes of FIG. 3. Then, in the case of receiving the HTTP request including the pass of the FW page (trigger for the processes of FIG. 6), the printer 10 sends the FW check script to the PC 50 (or executes the FW check), and determines YES to S100 in the case where the presence of the new FW is confirmed.

(Variant 14) The FW check may not be executed at all. In this case, in the case of receiving the HTTP request including the pass of the top page, the printer 10 sends the top page data not including the update information to the PC 50 instead of the processes of FIG. 3. Then, in the case of receiving the HTTP request including the pass of the FW page (trigger for the processes of FIG. 6), the printer 10 proceeds to S120 without executing S100. The printer 10 executes S130 and S132 in the case where the FW received at S128 or S148 is newer than the current FW, and does not execute S130 and S132 in the case where the FW received at S128 or S148 is not newer than the current FW. In this variant, "sending of first version information indicating the first version and second program" and "receiving of the result information" may be omitted.

(Variant 15) A "communication device" does not need to be the printer 10, and it may be other types of devices such as a scanner, a facsimile, a PC, or a server.

(Variant 16) In the above embodiments, the processes of FIGS. 2 to 9 are realized by software (i.e., the basic program in the ROM 40), however, at least one of these processes may be realized by hardware such as a logic circuit.

What is claimed is:

1. A communication device comprising:
a processor; and
a memory storing setting data which is a program of a first version and computer-readable instructions therein, the computer-readable instructions, when executed by the processor, causing the communication device to:
send top page data to a terminal device, the top page data representing a top page among web pages which are capable of being supplied by the communication device,
send first version information indicating the first version and second program to the terminal device, the second program causing a browser program in the terminal device to perform a second process while the top page represented by the top page data is displayed in the terminal device, wherein the second process includes:
sending the first version information to a second server, wherein the second server is configured to store second version information indicating a second version which is a newest version of the program, and determine whether the second version indicated by the second version information is newer than the first version indicated by the first version information;
receiving result information indicating a result of the determination from the second server in response to sending the first version information to the second server; and
sending the result information to the communication device,
wherein the computer-readable instructions, when executed by the processor, further cause the communication device to:
receive the result information from the terminal device in response to sending the first version information and the second program to the terminal device;
determine whether the communication device is capable of communicating with a first server;
in a case where it is determined that the communication device is not capable of communicating with the first server and the result information indicates that the second version is newer than the first version, send Uniform Resource Locater (URL), first program and update page data to the terminal device, the URL indicating a storage location of update data stored in the first server, the update data being used for updating the setting data, the first program causing the browser program in the terminal device to perform a first process, the update page data representing an update page among the web pages, the update page including an update button for updating the program from the first version to the second version, the first program being for causing the terminal device to perform the first process in a case where the update button in the update page is operated, wherein the first process includes:
receiving the update data from the first server by using the URL received from the communication device; and sending the update data received from the first server to the communication device;
in a case where it is determined that the communication device is not capable of communicating with the first server and the result information indicates that the second version is newer than the first version, receive the update data from the terminal device in response to sending the URL and the first program to the terminal device; and
in a case where it is determined that the communication device is not capable of communicating with the first server and the result information indicates that the second version is newer than the first version, update the setting data stored in the memory by using the update data received from the terminal device, wherein in a case where the result information indicates that the second version is not newer than the first version, the URL and the first program are not sent to the terminal device, and
the computer-readable instructions, when executed by the processor, further cause the communication device to:
in a case where it is determined that the communication device is capable of communicating with the first server, send a first request including the URL to the first server;
in a case where it is determined that the communication device is capable of communicating with the first server, receive the update data from the first server in response to sending the first request to the first server; and
in a case where it is determined that the communication device is capable of communicating with the first server, update the setting data stored in the memory by using the update data received from the first server.

2. The communication device as in claim 1, wherein the program is a firmware.

3. The communication device as in claim 1, wherein the first program is described by a script being interpretable by the browser program.

4. The communication device as in claim 1, wherein the determination whether the communication device is capable of communicating with the first serve is executed in a case where the communication device receives a specific request for an update from the terminal device being different from the communication device.

5. The communication device as in claim 1, wherein the URL and the first program are sent to the terminal device in response to an operation on the terminal deice, without the communication device accepting an operation, and
the first request is sent to the first server in response to an operation on the terminal deice, without the communication device accepting an operation.

6. A non-transitory computer-readable medium storing computer-readable instructions for a communication device comprising a memory storing setting data which is a program of a first version,
the computer-readable instructions, when executed by a processor of the communication device, causing the communication device to;
send top page data to a terminal device, the top page data representing a top page among web pages which are capable of being supplied by the communication device,
send first version information indicating the first version and second program to the terminal device, the second program causing a browser program in the terminal device to perform a second process while the top page represented by the top page data is displayed in the terminal device, wherein the second process includes:
sending the first version information to a second server, wherein the second server is configured to store second version information indicating a second version which is the newest version of the program, and determine whether the second version indicated by the second version information is newer than the first version indicated by the first version information;
receiving result information indicating a result of the determination from the second server in response to sending the first version information to the second server; and
sending the result information to the communication device,
wherein the computer-readable instructions, when executed by the processor, further cause the communication device to:
receive the result information from the terminal device in response to sending the first version information and the second program to the terminal device;
determine whether the communication device is capable of communicating with a first server;
in a case where it is determined that the communication device is not capable of communicating with the first server and the result information indicates that the second version is newer than the first version, send Uniform Resource Locater (URL), first program and update page data to the terminal device, the URL indicating a storage location of update data stored in the first server, the update data being used for updating the setting data, the first program causing the browser program in the terminal device to perform a first process, the update page data representing an update page among the web pages, the update page includes an update button for updating the program from the first version to the second version, the first program is for causing the terminal device to perform the first process in a case where the update button in the update page is operated, wherein the first process includes:
receiving the update data from the first server by using the URL received from the communication device; and
sending the update data received from the first server to the communication device;
in a case where it is determined that the communication device is not capable of communicating with the first server and the result information indicates that the second version is newer than the first version, receive the update data from the terminal device in response to sending the URL and the first program to the terminal device; and
in a case where it is determined that the communication device is not capable of communicating with the first server and the result information indicates that the second version is newer than the first version, update the setting data stored in the memory by using the update data received from the terminal device,
wherein in a case where the result information indicates that the second version is not newer than the first version, the URL and the first program are not sent to the terminal device, and
the computer-readable instructions, when executed by the processor, further cause the communication device to:
in a case where it is determined that the communication device is capable of communicating with the first server, send a first request including the URL to the first server;
in a case where it is determined that the communication device is capable of communicating with the first server, receive the update data from the first server in response to sending the first request to the first server; and
in a case where it is determined that the communication device is capable of communicating with the first server, update the setting data stored in the memory by using the update data received from the first server.

* * * * *